CONCENTRATION OF AMINE VS. TIME

INVENTORS
TIMOTHY N. JOHNSON
EINAR P. BIRKELO

United States Patent Office 3,311,659
Patented Mar. 28, 1967

3,311,659
PROCESS FOR PREPARING HIGHER FATTY ALKYL DILOWERALKYL BENZYL AMMONIUM HALIDES
Einar P. Birkelo, Minneapolis, and Timothy N. Johnson, St. Paul, Minn., assignors to Rayette-Faberge, Inc., a corporation of Minnesota
Filed Nov. 21, 1963, Ser. No. 325,327
7 Claims. (Cl. 260—567.6)

This invention relates to an improved method of formation of N-benzyl higher fatty alkyl diloweralkyl quaternary ammonium halides, and to improved reaction between benzyl halide and higher fatty alkyl diloweralkyl amine to form the quaternary ammonium halide by effecting this reaction in the presence of a higher fatty acid amide, and the product thereof which is useful as an improved component of a hair rinse.

Figure 2:
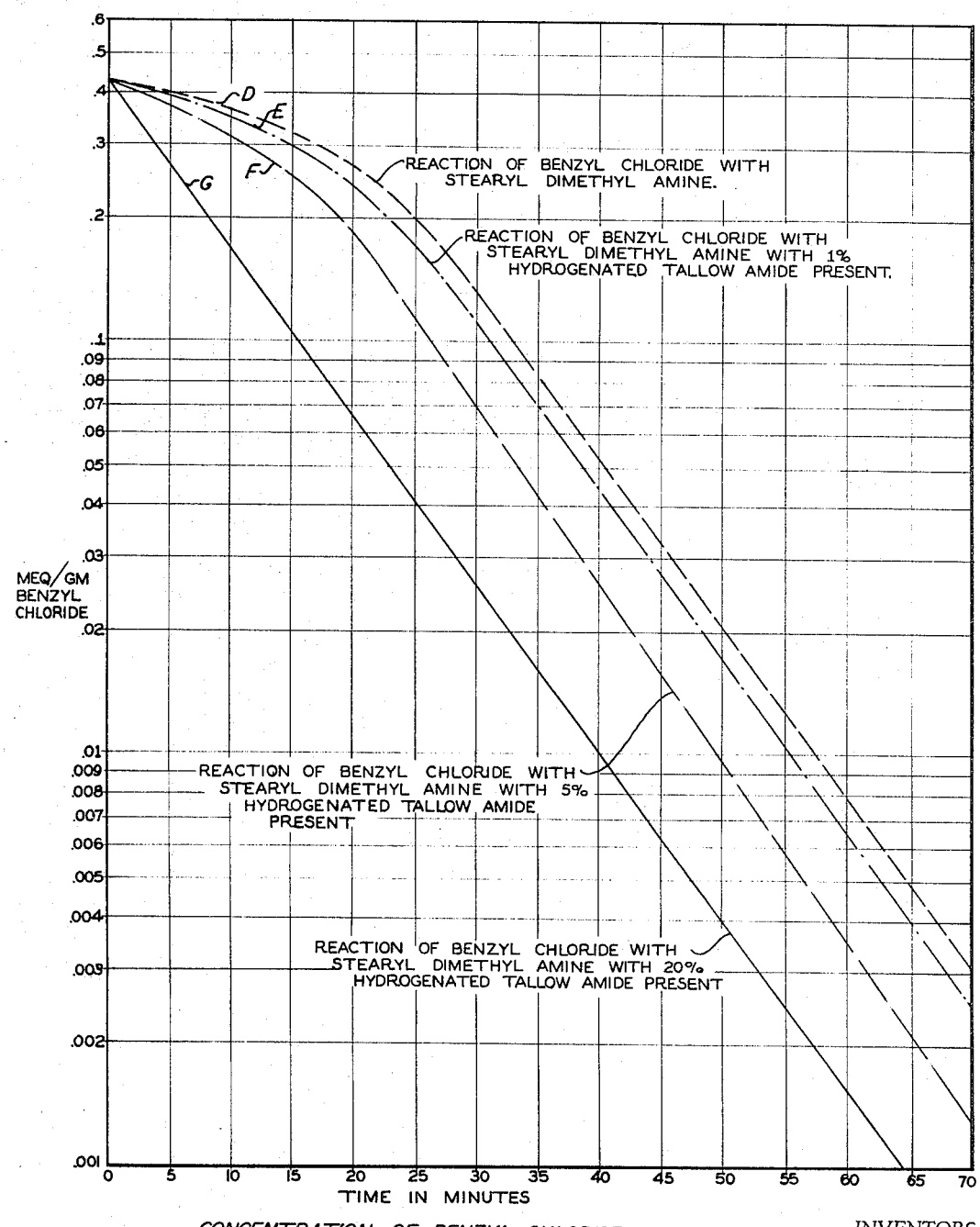

The quaternizing reaction between a higher fatty alkyl diloweralkyl amine, typically stearyl dimethyl amine, and a benzylating agent, typically benzyl chloride, in water, might be regarded as a second order reaction; that is, first order with respect to each of the components and a plot of the log of the concentration of either of the reactants v. reaction time, should be linear, but it is not. Rather, the curve is non-linear as shown in FIG. 2 plotting the data of Example I below. This type of curve probably results from an apparently necessary initial induction period to elapse in the form of some solubilizing quaternary compound from the initial reaction components, both of which are insoluble in the aqueous reaction medium before the ultimate solubilizing thereof increases their reaction rate substantially. That reaction, moreover, is usually effected in the presence of a slight excess of the insoluble amine and, consequently, the reaction, despite the ultimate conversion of all of the benzyl chloride to quaternary which, by its high surface-active character, would be expected to exert a solubilizing effect upon the excess amine, nevertheless results in a continuously opalescent or milky emulsion type aqueous reaction product which makes it difficult to observe the visible progress of the reaction since there are always some insoluble components present. Moreover, there are no other useful chemical quick-test properties of such reaction such as with color or pH, since both are relatively invariable. Hence, the progress of this reaction is not only uneconomically slow, requiring large batch-wise equipment, it is also only laboriously controlled, by extensive time-consuming tests to determine reaction conditions and the progress thereof.

According to the present invention, we have found that the addition of a minor quantity of higher fatty acid amides, such as 10 to 22 carbon fatty acid amides, greatly accelerates the initial reaction mixture to a substantially immediate reaction rate at least as high as would be available from the substantial presence of quaternary in the later reaction stages. That higher fatty acid amide, moreover, has several other valuable properties.

A second important property of the amide is the slight formation of acidic byproducts, not certainly identified, but which are possibly of the nature of an N-benzyl fatty acid amide derivative. Such byproducts are theoretically present in small quantity and maintain a desirably buffered pH. That buffering of pH is a valuable property in the quaternary compound composition produced for use in a hair creme rinse because it provides a control over the pH in use dilutions. The presence in the reaction mixture of the higher fatty acid amide also has a solubilizing effect upon unreacted components long before endpoint is reached which is apparent at raised temperatures of the reaction, whereby it establishes soon after reaction initiation a transparency of the solution despite the presence of any usually used excess of insoluble amine. That transparency is a useful control to exhibit a rapid approaching endpoint in large batch reactions.

Most important is the property of the higher fatty acid amide to greatly accelerate the initial quaternizing reaction, allowing completion of the reaction in about one quarter the usual reaction time. Thus there results a substantial saving in both the time needed for commercial processing of large batches as well as equipment necessary therefor.

A substantial acceleration of the reaction rate is noticeable when the fatty acid amide is present in quantity as low as 1% of the higher alkyl tertiary amine. The reaction rate increases progressively with increasing quantities of the fatty acid amide up to about 20% of the amine, and while even larger quantities could be used, corresponding advantage is not present. Consequently, a practical range of the fatty acid amide used is about 1 to 20% of the amine present in the reaction.

The tertiary amine itself may comprise a higher fatty alkyl dilower alkyl amine wherein the fatty alkyl may range from about 10 to 22 carbon atoms and the lower alkyl component is methyl, ethyl, propyl or mixed lower alkyls. Typical amine examples are dodecyl dimethyl amine, tetradecyl ethyl methylamine, hexadecyl diethyl amine and octadecyl dimethyl amine. The fatty acid amide may be derived from the same fixed oil source as the higher fatty alkyl for commercial feasibility, but not necessarily so. Typical higher fatty acid amides are, therefore, arachidyl acid amide, behenyl acid amide, tallow acid amide, coconut oil acid amide and the like. When derived from natural oil, the fatty hydrocarbon chain may be hydrogenated. Thus, the higher fatty acid amide, too, may range from 10 to 22 carbon atoms.

In carrying out the reaction, the high fatty alkyl dilower alkyl amine in slight excess, and preferably with a small quantity of the high fatty alkyl amine unsubstituted (primary amine) and fatty acid amide are heated to about the boiling point in water and agitated to a uniform emulsion or dispersion, the mixture being cooled to an intermediate temperature usually about 50 to 75° C. and the benzyl chloride is then added with continued agitation while the temperature is held constant and the agitation continued until the reaction is complete.

The following examples illustrate the effect of the amide upon the reaction rate. In each of the tables, the rate constants were calculated.

*Example I*

Heat 1100 grams of water and 206 grams of stearyl dimethylamine to 90° to 100° C. Then add 16 grams of stearyl dimethylamine and mix until uniform. Cool the amine mixture to from 62° to 65° C., adding 76.5 grams of benzyl chloride and react sixty minutes at from 62° to 65° C.

| Reaction Time (min.) | 0 | 10 | 20 | 30 | 40 | 50 | 60 |
|---|---|---|---|---|---|---|---|
| C amine, meq./gm. | 0.540 | 0.495 | 0.385 | 0.262 | 0.168 | 0.128 | 0.113 |
| K | | 0.009 | 0.017 | 0.024 | 0.029 | 0.029 | 0.026 |
| $C_{\phi CH_2Cl}$, meq./gm. | 0.430 | 0.385 | 0.275 | 0.150 | 0.058 | 0.018 | 0.003 |
| $K_{\phi CH_2Cl}$ | | 0.011 | 0.022 | 0.035 | 0.050 | 0.063 | 0.083 |

C amine denotes the concentration of the amine in meq./gm. K amine is the reaction rate assuming a first order reaction with respect to the amine. $C_{\phi CH_2Cl}$ is the concentration of the benzyl chloride in meq./gm. $K_{\phi CH_2Cl}$ is the reaction rate assuming a first order reaction with respect to the benzyl chloride.

The rate constants were calculated by the following expression:

$$K = \frac{2.303}{T} \log \frac{C_o}{C}$$

where $C_o$=initial concentration of a reactant and $C$=the concentration of that reactant at time T.

Example II

Heat 1100 grams of water, 206 grams of stearyl dimethylamine, 2.06 grams of stearylamide and 16 grams of stearylamine to from 90° to 100° C. Mix until homogeneous and cool the amine-amide mixture to from 62° to 65° C., add 76.5 grams of benzyl chloride and react for sixty minutes at from 62° to 65° C.

| Reaction Time (min.) | 0 | 10 | 20 | 30 | 40 | 50 | 60 |
|---|---|---|---|---|---|---|---|
| C amine, meq./gm | 0.540 | .460 | .355 | .220 | .151 | .127 | .118 |
| K | | 0.016 | .020 | .030 | .037 | .029 | .025 |
| $C_\phi CH_2Cl$, meq./gm | 0.430 | .350 | .245 | .110 | .041 | .017 | .008 |
| K | | .021 | .028 | .045 | .059 | .066 | .066 |

Example III

Heat 1100 grams of water, 206 grams of stearyl dimethylamine, 10.2 grams stearylamide and 16 grams of stearylamine to from 90° to 100° C. Mix until the amine-amide mixture is homogeneous and cool to from 62° to 65° C. Add 76.5 grams of benzyl chloride and react sixty minutes at from 62° to 65° C.

| Reaction Time (min.) | 0 | 10 | 20 | 30 | 40 | 50 | 60 |
|---|---|---|---|---|---|---|---|
| C amine, meq./gm | .535 | .445 | .295 | .180 | .135 | .115 | .105 |
| K | | .018 | .030 | .036 | .034 | .026 | .023 |
| $C_\phi CH_2Cl$, meq./gm | 0.430 | .313 | .190 | .075 | .030 | .010 | |
| K | | .034 | .041 | .058 | .066 | .075 | |

Example IV

Heat 1100 grams of water, 206 grams of stearyl dimethylamine, 16 grams of stearylamine and 41.2 grams of stearylamide to from 90° to 100° C. Mix until the amine-amide mixture is homogeneous. Cool the mixture from 62° to 65° C. and add 76.5 grams of benzyl chloride and then react sixty minutes at from 62° to 65° C.

| Reaction Time (min.) | 0 | 10 | 20 | 30 | 40 | 50 | 60 |
|---|---|---|---|---|---|---|---|
| C amine, meq./gm | .525 | .286 | .169 | .130 | .116 | | |
| K | | .061 | .057 | .047 | .038 | | |
| $C_\phi CH_2Cl$, meq./gm | 0.420 | .181 | .064 | .025 | .011 | | |
| $K_\phi CH_2Cl$ | | .084 | .094 | .094 | .091 | | |

As will be noted from the examples, the reaction is usually carried out in the presence of a small quantity of a primary amine, preferably a higher fatty alkyl primary amine. It is most feasible to use a primary amine corresponding to the higher fatty alkyl component of the tertiary amine and, in any case, one having from 10 to 22 carbon atoms in the fatty alkyl group. That primary amine component is usually used in quantity of about 5 to 10% by weight of the tertiary amine.

The several examples illustrate the progress of the benzyl halide-higher fatty alkyl dilower alkyl tertiary amine quaternizing reaction using, for example, as reaction components, benzyl chloride and stearyl dimethyl amine. The columns list both analyses of the reaction mixture as well as computed reaction rate indicated by the reaction constant K, at regular time intervals. Each of the reaction mixtures contains an excess of primary stearyl amine. The reaction to form the quaternary compound is apparently self-catalyzing. The quaternary compound formed, stearyl dimethyl benzyl ammonium chloride, has surface-active properties. It therefore apparently tends to solubilize the initially very insoluble reaction components, the unreacted benzyl chloride and the tertiary amine, making them soluble, and thus more readily available for interaction. Consequently, the reaction starts off very slowly, there being no solubilizing reaction product initially available, and after what may be termed an induction period to form substantial solubilizing quantities of the surface-active product accelerates to a quite rapid rate. It is the initial induction period needed to produce such solubilizing quantity of reaction product which long delays the potentially rapid reaction.

Figure 1:
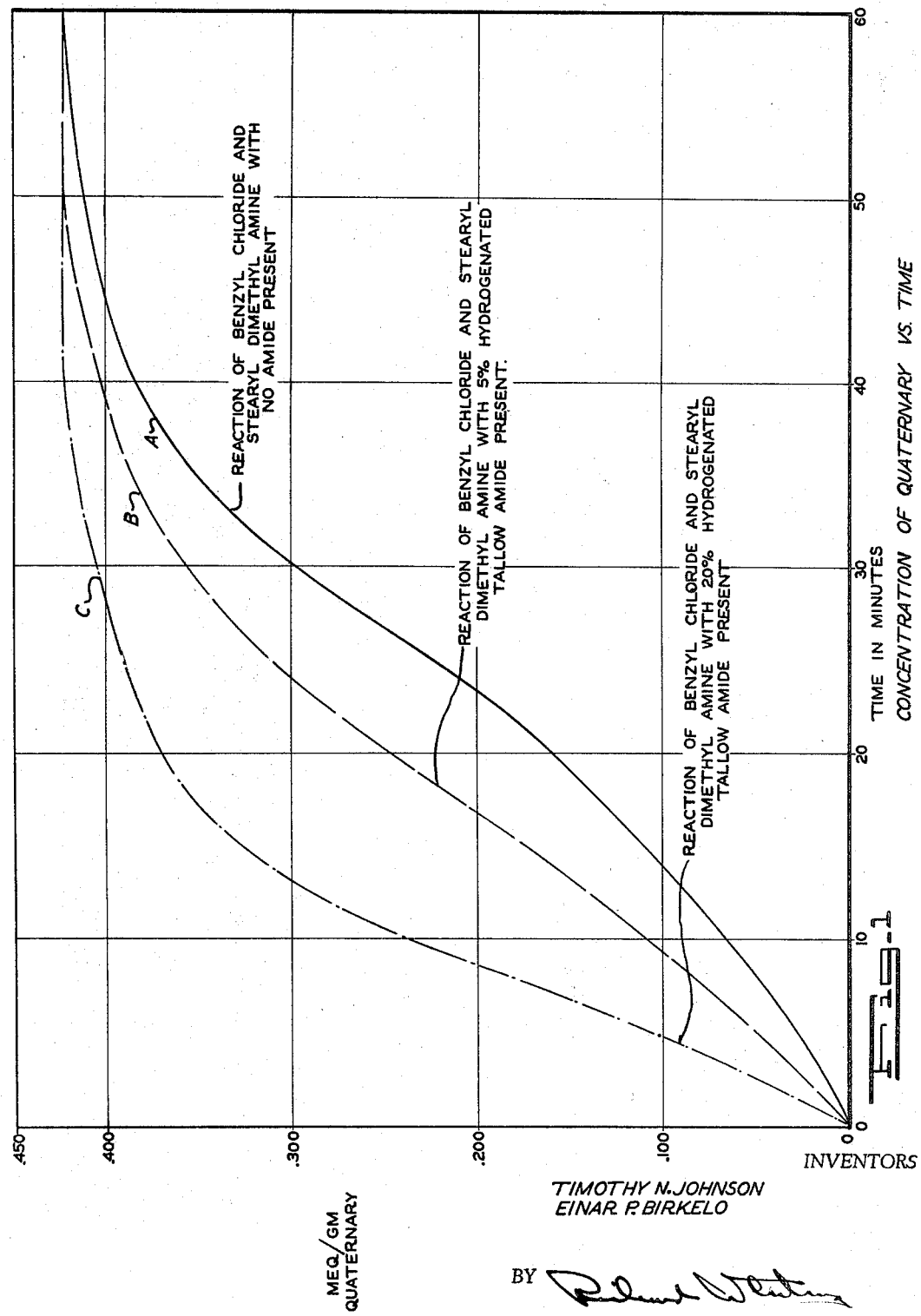

The curve plotting the concentration of the quaternary compound formed against the reaction time has an S-shape, illustrated by curve A of FIG. 1, as would be expected from that type of reaction. The curves B and C, FIG. 1, respectively reflect the reaction using 10.2 grams (5%) and 41.2 grams (20%) based on the amine of the stearyl amide of examples III and IV. Since the induction periods are progressively less, they are initially much steeper, the slope thus illustrating the far greater reaction rate in the early stages below about 20 minutes of reaction time.

The second series of curves of FIG. 2 are plots of the log of the concentration of the unreacted component, benzyl chloride, against the reaction time. If that reaction of the benzyl chloride with the stearyl dimethyl amine were an ordinary second order reaction, as might be expected from the simple equation to form the quaternary by admixture of the two reaction components, the curves should be entirely linear. However, the first reaction without the stearyl amide, according to Example I, curve D, has a long induction period of about 30 minutes before the rate of reaction indicates approach to a linear function, the initial curved portion indicating this induction period delay to form a solubilizing quantity of quaternary.

The initial reaction rate accelerating effect of the higher fatty acid amide upon this reaction is noticeable in quantity as low as 1% as illustrated in Example II and curve E. That is, the induction period is slightly reduced from curve D even by such small quantity of fatty acid amide solubilizing component present in the initial reaction mixture. A substantially larger quantity of 5% of solubilizing stearyl amide very greatly further reduces the induction period as will be noted from Example III and curve F. However, the reaction rate becomes so accelerated right from the beginning, using a quantity of higher fatty acid amide of 20%, that it is substantially straight line on this logarithmic plot. That is, the induction period is substantially eliminated and the reaction proceeds at a high rate substantially from the beginning.

Figure 3:
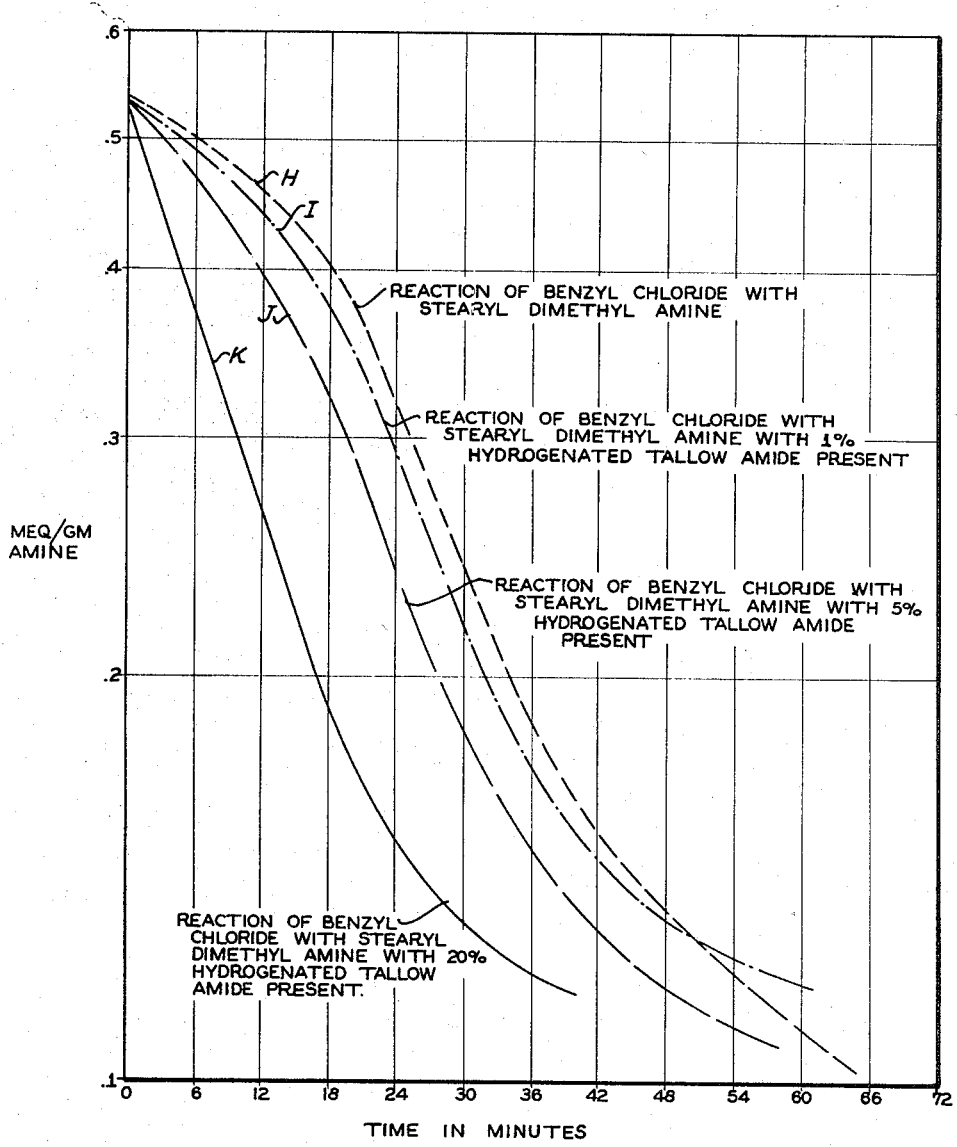

That series of curves of FIG. 2 are only incidentally based upon one of the reaction components, benzyl chloride. Substantially the same curves are developed when logarithmic concentrations of the tertiary amine are plotted against the time, according to FIG. 3. Inasmuch as an excess of amine is always present in the examples, at about the endpoint of the reaction the curves bend asymptotically towards the limiting concentrations of the excess of the amine used.

The several curves illustrate that at about 20% concentration of the high fatty acid amide based on the tertiary amine, the reaction rate becomes constant immediately, but requires about 30 minutes of reaction time when no fatty acid amide is present. For instance, comparing the quantity of stearyl amide used as percent of the amine with the percent of benzyl chloride reacted after 20 minutes, the data sums up as follows.

| Percent amide: | Percent chloride reacted after 20 min. |
|---|---|
| 0 | 37 |
| 1 | 44 |
| 5 | 58 |
| 20 | 85 |

It is quite surprising to find that 85% of the benzyl chloride has reacted in twenty minutes when the concentration of the amide is 20% of the amine, more than twice the corresponding quantity of reacted benzyl chloride when there is no stearyl amide present in the reaction mixture. The saving in time by the reaction and the equipment needed to produce a given output of the end product is well illustrated.

While we do not wish to be limited to a theory of reaction, it would appear that the effect of the fatty acid amide, either of itself or through a possible intermediate, exerts a solubilizing effect upon the otherwise insoluble reacting components such as would possibly be produced by the quaternized end product after, for example, 85% reaction had taken place. That is, the solubilizing effect gives results which are noticeable only during the first twenty minutes of the reaction.

Another important result of using higher fatty acid amide is that the reaction mixture becomes perfectly clear, transparently clear, before the reaction is completed. This is true despite the fact that there is always present an excess of water insoluble amine according to the examples above. It would be expected the excess unreacted water-insoluble amine still present, even when the reaction is completed, would produce a cloudy effect. This clarity of the reaction mixture, on the other hand, is never present when the amide is not used. The same same transparency effect was produced by other fatty acid amides such as cocoa acid amide and arachidyl-behenyl acid amide. Again, that effect was also produced when different higher fatty alkyl dilower alkyy amines were used; for instance, dodecyl dimethyl amine, tetradecyl dimethyl amine, hexadecyl dimethyl amine and octadecyl dimethyl amine in the presence of a fatty acid amide.

The higher fatty acid amide further, as pointed out above, has a second desirable effect in stabilizing the pH of a concentrate as well as a dilution product of the reaction mixture. Such a dilution product is usual for a creme type hair rinse and would usually contain from 0.5 to 2.0% of the reaction mixture (0.2 to 0.5% on a solids basis). Without the higher fatty acid amide, the pH of the dilution product is more variable and must often be adjusted to obtain the desirable pH range of 3.0 to 4.5 of a hair rinse. This undesirable variation of pH of the dilution product results in a pH outside of the acceptable range. On the other hand, where the higher fatty acid amide is present in the quaternary reaction product, its dilution product is mildly buffered and remains stabilized in the desired pH range of 3 to 4.5. The following table illustrates the pH of both the concentrate and the dilution product of the examples as set forth above.

| Percent Amide Added | pH Concentrate | pH 0.5% Solids |
|---|---|---|
| 0 | 3.40 | 5.25 |
| 0 | 3.40 | 5.80 |
| 1 | 3.65 | 4.05 |
| 5 | 3.70 | 3.65 |
| 5 | 3.80 | 3.72 |
| 20 | 3.65 | 3.75 |

In forming the quaternary product hereof into a creme hair rinse, it is usual to dilute one of the reaction mixtures, as stated above, about 8 to 15 times with water and add small quantities from 0.1 to 2.0% of a non-ionic emollient hair conditioning substance, for example a higher fatty alcohol, cetyl alcohol higher fatty esters, and a small quantity of salt such as sodium chloride or sodium sulfate.

The following example illustrates the forming of a hair rinse.

Example V

|   | Parts |
|---|---|
| Mixture in Example IV | 20 |
| Cetyl alcohol | 1 |
| Sodium chloride | 1 |
| Water | 185 |

HCl sufficient to adjust pH to 3.0 to 4.5.

Various modifications will occur to those skilled in the art. Accordingly, it is intended that the description contained in the drawings and the examples given above be regarded as illustrative and not limiting except as defined in the claims appended hereto.

We claim:
1. The process of preparing higher fatty alkyl diloweralkyl benzyl quaternary ammonium halides which comprises reacting benzyl halide with a higher fatty alkyl diloweralkyl amine in the presence of about 1 to 20% by weight of the amine of a higher fatty acid amide.

2. In the process of preparing higher fatty alkyl diloweralkyl benzyl quaternary ammonium halides, the step of accelerating the reaction between a benzyl halide and a higher fatty alkyl diloweralkyl amine in hot aqueous medium and buffering the reaction mixture comprising adding a minor quantity of a higher fatty acid amide to the said reaction mixture.

3. The method of rapidly forming higher fatty alkyl diloweralkyl benzyl quaternary ammonium halide comprising reacting a slight excess of higher fatty alkyl diloweralkyl amine with benzyl halide in hot aqueous liquid medium in the presence of about 1 to 20% by weight of the said tertiary amine of a higher fatty acid amide.

4. The method as defined in claim 3 wherein the amine further contains higher fatty alkyl primary amine in quantity of about 5 to 10% by weight of the tertiary amine.

5. The method as defined in claim 3 wherein both the higher fatty alkyl component of the tertiary amine and the higher fatty acid component of the amide each have from 10 to 22 carbon atoms.

6. The process of rapidly forming higher fatty alkyl dimethyl benzyl chloride comprising reacting benzyl chloride with a hot aqueous mixture containing a slight excess of higher fatty alkyl dimethyl amine and about 1 to 20% by weight of said amine of a higher fatty acid amide, said higher fatty alkyl component of said amine and the fatty acid component of said amide having from 10 to 22 carbon atoms.

7. The process as defined in claim 6 wherein said mixture contains higher fatty alkyl primary amine in quantity of about 5 to 10% by weight of the said tertiary amine.

References Cited by the Examiner

UNITED STATES PATENTS

| 1,636,341 | 7/1927 | Wheeler | 167—88 |
| 2,149,319 | 3/1939 | Soussa | 167—88 |
| 2,664,444 | 12/1953 | Kwarler | 260—567.6 |
| 2,681,365 | 6/1954 | Hallock | 260—567.6 |

CHARLES B. PARKER, *Primary Examiner.*

R. V. HINES, *Assistant Examiner.*